UNITED STATES PATENT OFFICE.

KARL SCHIRMACHER AND FRIEDRICH SCHMIDT, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ORTHO-OXYAZO DYE.

No. 826,279.     Specification of Letters Patent.     Patented July 17, 1906.

Application filed August 4, 1905. Serial No. 272,629.

*To all whom it may concern:*

Be it known that we, KARL SCHIRMACHER, Ph. D., and FRIEDRICH SCHMIDT, Ph. D., chemists, citizens of the Empire of Germany, residing at Höchst-on-the-Main, Germany, have invented certain new and useful Improvements in the Manufacture of Ortho-Oxymonoazo Dyestuffs, of which the following is a specification.

We have found that by combining the diazo compound of ortho-amidophenol with 1:8:3:6-dioxynaphthalenedisulfonic acid $$(C_{10}H_4(OH)_2(SO_2H)_2,$$

being the so-called "chromotropic" acid, a valuable monoazo dyestuff may be obtained, which yields beautiful blue shades of great fastness when fixed as chrome-lake on chrome-mordanted wool or dyed on unmordanted wool and developed subsequently with chromates.

The manufacture of the dyestuff is carried out as follows: diazotized ortho-amidophenol is combined with chromotropic acid in a strong caustic-alkaline solution or in presence of hydrate of lime.

The composition of the dyestuff in form of the sodium salt is represented by the following formula:

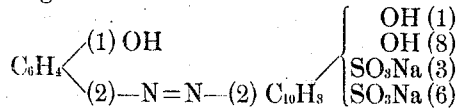

Example: 10.9 kilograms of ortho-amidophenol are diazotized with thirty kilograms of hydrochloric acid of about 20° Baumé and 6.9 kilograms of nitrite and gradually introduced at ordinary temperature into an aqueous solution of thirty-eight kilograms of the disodium salt of chromotropic acid $$C_{10}H_4(OH)_2(SO_3Na)_2,$$

thirty kilograms of finely-divided hydrate of lime having been stirred in. The formation of the dyestuff is complete after about eight hours. It may be acidified with hydrochloric acid and the dyestuff salted out with common salt.

When dry, the dyestuff is a reddish-gray-black powder soluble in water with a red color. On adding sodium carbonate the solution turns bluer. On adding dilute hydrochloric acid hardly any change is produced in the color. In concentrated sulfuric acid the dyestuff is soluble with a violet color. The dyeing in an acid-bath is fuchsia-red, while the dyeing as chrome-lake is blue. By reducing with tin and hydrochloric acid the dyestuff is splitted into ortho-amidophenol and amidochromotropic acid.

Having now described our invention, what we claim is—

As a new product, the ortho-oxymonoazo dyestuff having as a sodium salt the formula:

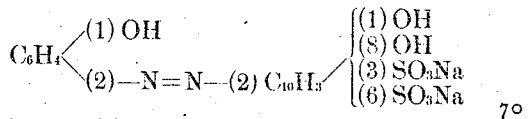

being a reddish-gray-black powder soluble in water with a red color which on adding sodium carbonate becomes bluer, while on adding dilute hydrochloric acid hardly any change is produced in the color; the dyestuff reduced with tin and hydrochloric acid being decomposed into ortho-amidophenol and amidochromotropic acid and dyeing wool in an acid-bath fuchsia-red; the dyeing as chrome-lake being blue.

In testimony that we claim the foregoing as our invention we have signed our names in presence of two subscribing witnesses.

KARL SCHIRMACHER.
    FRIEDRICH SCHMIDT.

Witnesses:
    ALFRED BRISBOIS,
    BERNHARD LYDECKER.